US012220838B2

(12) United States Patent
Rossart

(10) Patent No.: US 12,220,838 B2
(45) Date of Patent: Feb. 11, 2025

(54) DEVICE AND METHOD FOR FORMING VOIDS IN CONCRETE

(71) Applicant: Raise the Bar Detailing, Port Ludlow, WA (US)

(72) Inventor: Raelene Marie Rossart, Port Ludlow, WA (US)

(73) Assignee: Raise the Bar Detailing, Port Ludlow, WA (US)

( * ) Notice: Subject to any disclaimer, the term of this patent is extended or adjusted under 35 U.S.C. 154(b) by 788 days.

(21) Appl. No.: 17/255,040

(22) PCT Filed: Jun. 19, 2019

(86) PCT No.: PCT/US2019/037982

§ 371 (c)(1),
(2) Date: Dec. 22, 2020

(87) PCT Pub. No.: WO2019/246259

PCT Pub. Date: Dec. 26, 2019

(65) Prior Publication Data

US 2021/0245394 A1 Aug. 12, 2021

Related U.S. Application Data

(60) Provisional application No. 62/688,844, filed on Jun. 22, 2018.

(51) Int. Cl.

*B28B 7/16* (2006.01)
*B28B 7/28* (2006.01)
*B28B 23/02* (2006.01)

(52) U.S. Cl.

CPC ................ *B28B 7/162* (2013.01); *B28B 7/28* (2013.01); *B28B 23/022* (2013.01)

(58) Field of Classification Search

CPC ....... B28B 23/022; B28B 7/162; B28B 7/164; B28B 7/28; E04B 1/383; E04G 11/365; E04G 15/063

See application file for complete search history.

(56) References Cited

U.S. PATENT DOCUMENTS 4,118,906 A 10/1978 Preuninger et al.
4,821,994 A 4/1989 Fricker
(Continued)

FOREIGN PATENT DOCUMENTS

CN 1662352 A 8/2005
CN 1671527 A1 9/2005
(Continued)

OTHER PUBLICATIONS

Crete-Sleeve; URL=https://www.cretesleeve.com/products/; download date Jan. 28, 2021; pages.

*Primary Examiner* — John J DeRusso
*Assistant Examiner* — Victoria Bartlett
(74) *Attorney, Agent, or Firm* — Seed IP Law Group LLP

(57) ABSTRACT

Devices and methods for forming voids or cavities in concrete such that reinforcing bars can be used to connect different pours of concrete, the devices including an insert having a base and an elongate member extending from the base, and the method including coupling the insert to formwork, pouring concrete into the formwork, which surrounds the insert, allowing the concrete to partially cure, such that it retains its shape, removing the formwork and insert to form a void in the partially cured concrete, inserting a reinforcing bar into the void, applying adhesive to adhere the reinforcing bar to the concrete, and pouring concrete around the reinforcing bar, such that the reinforcing bar joins the two pours of concrete together via the void and adhesive.

11 Claims, 5 Drawing Sheets

(56) References Cited

U.S. PATENT DOCUMENTS

| | | | |
|---|---|---|---|
| 5,174,910 | A | 12/1992 | Pita |
| 5,608,991 | A | 3/1997 | Yamashita |
| 5,651,911 | A | 7/1997 | Pennypacker |
| 6,550,834 | B2 | 4/2003 | Fromelius |
| 7,004,443 | B2 | 2/2006 | Bennett |
| 2002/0096619 | A1 | 7/2002 | Lancelot, III et al. |
| 2003/0170093 | A1 | 9/2003 | Janeway |
| 2008/0203270 | A1 | 8/2008 | Connell et al. |
| 2015/0336289 | A1 | 11/2015 | Comerford et al. |
| 2018/0023296 | A1* | 1/2018 | Recker .................. E04G 21/147 52/126.6 |

FOREIGN PATENT DOCUMENTS

| | | | |
|---|---|---|---|
| EP | 0693597 | A1 | 1/1996 |
| JP | 2000-179151 | A | 6/2000 |
| WO | 99/61716 | A1 | 12/1999 |
| WO | 2009/068969 | A2 | 6/2009 |

* cited by examiner

DEVICE AND METHOD FOR FORMING VOIDS IN CONCRETE

CROSS REFERENCE TO RELATED APPLICATION

This application claims the benefit under 35 U.S.C. § 119(e) to U.S. Provisional Application 62/688,844 filed Jun. 22, 2018, which application is incorporated by reference herein in its entirety.

TECHNICAL FIELD

The present disclosure is directed a device and method for forming voids in concrete and, more particularly, to an insert that is removed from cured concrete to create a void for receiving reinforcing bars.

BACKGROUND

Description of the Related Art

It is common in the construction industry to complete concrete structures in multiple stages or phases, wherein each phase may include one or more pours of concrete. Typically, the pours are required to be connected, or joined together, with reinforcing bars in order to satisfy structural requirements. However, because prior pours consist of cured, hardened material, creating a sufficient connection between pours can be a challenge. While certain methods exist for joining pours, these existing methods suffer from several deficiencies.

One known method is to use a threaded rebar coupler attached to concrete formwork inside the first pour such that reinforcing bars for the second pour can be attached to the coupler. However, the issue with this method is that there are some applications which require reinforcing bars in a second or subsequent pour that are not straight. Spinning a bent bar into the threads of the coupler in the first pour is not always possible. This method can also be prohibitively expensive for budget-constrained projects.

A second method is to wait for the first pour of concrete to cure and then drill holes into the cured concrete. Once the holes are drilled, an approved epoxy resin can be used to secure the reinforcing bars for the second pour into the first pour. While this may account for bent bars to some degree, this method suffers from additional issues. For example, drilling the holes can be time-consuming, can damage reinforcing bars in the first pour, and drilling might not even be allowed in conjunction with certain types of structures, such as post-tensioned concrete structures. Further, certain regulatory agencies, such as the Occupational Safety and Health Administration ("OSHA") have issued new rules regarding the drilling process, as silica dust created by concrete drilling has been deemed a health risk to those around drilling operations. In order to avoid violation of these new rules, additional equipment may need to be used in conjunction with time-consuming procedures to protect the health of those in the area of concrete drilling operations.

As such, there remains a need for a cost-effective, efficient, and safe device and method for forming voids in concrete to receive reinforcing bars such that multiple pours or phases of concrete structures can be more easily, efficiently, and effectively joined together.

BRIEF SUMMARY

A first exemplary implementation of a device for forming a void in concrete or other material may be summarized as including: a base having a plurality of holes, each of the holes having a size and a shape to receive a securing element for coupling the base to a piece of formwork; and an elongate member extending from the base, the elongate member having a shape and a size to create the void when the concrete cures around the elongate member, the void having a size and a shape to receive a reinforcing bar. The device may further include: the elongate member having a coating on an outer surface, the coating preventing adhesion between the outer surface and the concrete; the base and the elongate member comprising plastic or metal; the elongate member having a constant circular cross section along its length; and the elongate member being perpendicular to the base or at an angle with respect to the base.

An exemplary implementation of a method for forming a void in the concrete may be summarized as including: coupling an insert having a base plate and an elongate member extending from the base plate to a first piece of formwork; coupling the first piece of formwork to a second piece of formwork; pouring concrete proximate the first and second pieces of formwork, the concrete surrounding a portion of the base plate and the elongate member of the insert; and removing the first piece of formwork and the insert after curing the concrete, the removing including the concrete having a void with a size and a shape of the insert.

The method may further include: the base plate having a planar first surface coupled adjacent the first piece of formwork and a planar second surface opposite the planar first surface; the elongate member having a cylindrical shape; inserting a reinforcing rod into the void, and adhering the reinforcing bar to the sidewalls of the void; and adhering the reinforcing bar to sidewalls of the void with epoxy.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed implementations. However, one skilled in the relevant art will recognize that the present disclosed implementations may be practiced without one or more of these specific details, or with other methods, components, materials, etc. In other instances, well-known structures or components, or both, that are associated with the environment of the present disclosure have not been shown or described in order to avoid unnecessarily obscuring descriptions of the implementations.

Unless the context requires otherwise, throughout the specification and claims that follow, the word "comprise" and variations thereof, such as "comprises" and "comprising," are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

The present disclosure is directed to an insert for forming a void in concrete having a base plate and an elongate member extending from the base. The insert is coupled to concrete formwork, concrete is poured and cured, and the insert is removed, thus leaving a void. Preferably, the insert has a size and a shape to enable the void left by the insert to receive reinforcing bars, such that reinforcing bars for a subsequent pour can be secured in the void, thereby allowing concrete pours to be joined together in a simple, safe, and efficient manner.

Figure 1B:
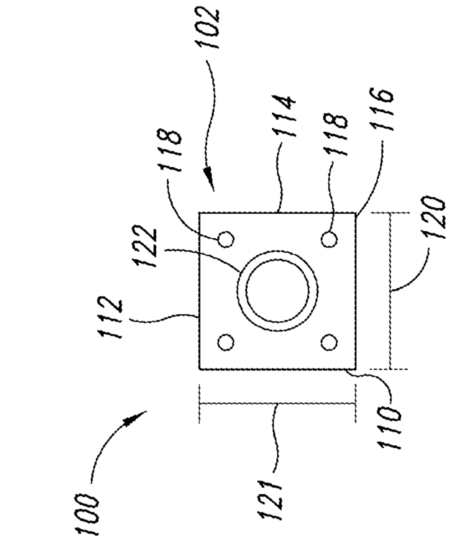
FIG. 1B is an end view of the insert of FIG. 1A.
Figure 1A:
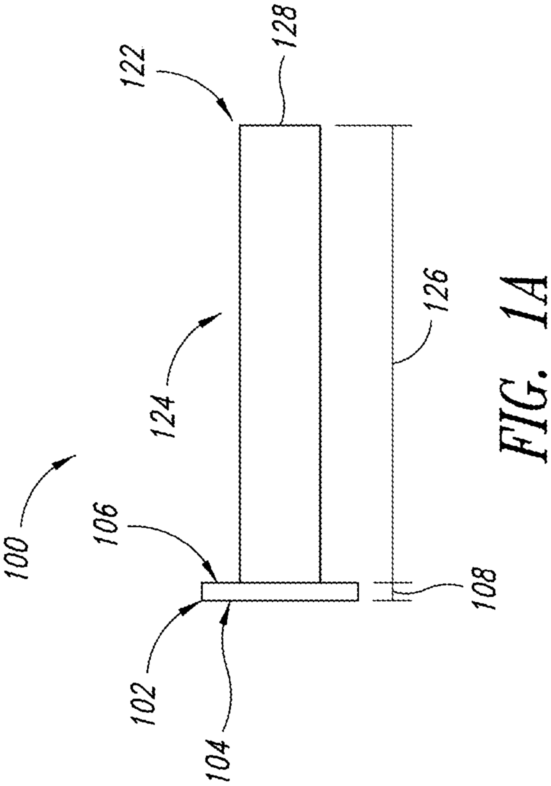
FIG. 1A is a side view of an exemplary implementation of an insert for forming a void in concrete formed in accordance with the present disclosure and having a base plate and an elongate member extending from the base plate.

FIGS. 1A-1B are views of an insert 100 for forming a void in concrete in accordance with the present disclosure. The insert 100 includes a base 102 and an elongate member 122 extending from the base. The base 102 and the elongate member 122 are preferably formed as a single, unitary, integral component, although in certain implementations, the base 102 is coupled to the elongate member 122. In some implementations, the coupling includes bonding the base 102 and elongate member 122 with an adhesive, while in other implementations, the coupling includes removably coupling the base 102 to the elongate member 122, which removable coupling may include, for example, screws, bolts, or a twist and lock mechanism. Further, implementations of the present disclosure include the base 102 and the elongate member 122 comprising a variety of materials. For example, in various implementations, the base 102 and the elongate member 122 comprise plastic, wood, or metal, among others.

As illustrated in FIG. 1A, the elongate member 122 includes an outermost surface 124 and a distal end 128. In an implementation, the outermost surface 124 includes a coating (not shown) to prevent adhesion between the outermost surface 124 and concrete when the insert 100 is inserted into concrete and the concrete is allowed to cure. However, more preferably, such a coating (not shown) is not necessary, as the insert 100 is removed when the concrete is partially cured. In this context, "partially cured" means that the concrete has cured to a sufficient degree to maintain the shape of the void left by removing the insert 100, but has not cured enough that a strong bond has formed between the concrete and the outermost surface 124. In further implementations, materials of the insert 100, and more particularly, the base 102 and the elongate member 122, inherently resist adhesion to a sufficient degree to allow removal of the insert 100 from the concrete irrespective of the degree of curing.

Moreover, the elongate member 122 is preferably a cylinder, which is to say that the elongate member 122 has a circular cross section with a constant outermost diameter along its length 126 from the base 102 to the distal end 128. However, one of skill in the art will appreciate that the elongate member 122 can have any number of various polygonal cross sections along its length 126, for example, the elongate member 122 can include a triangular cross section, a square cross section, a rectangular cross section, a trapezoidal cross section, a hexagonal cross section, or an ovular cross section, among others. In an implementation, it is even possible to have more than one of the above cross sections along the length 126 of the elongate member 122, or have a cross section which changes dimension along the length 126 of the elongate member 122, such as with a step-down configuration or a continuously tapered outermost surface 124.

The distal end 128 is illustrated as being generally flat and planar, although one of skill in the art will appreciate that the distal end 128 can be rounded, tapered, truncated, beveled, or chamfered, in addition to other possible configurations. The elongate member 122 is preferably hollow and open at the distal end 128. However, in other implementations, the elongate member 122 is closed at the distal end 128, in which case the elongate member 122 can be either hollow or solid along its length 126.

As illustrated in FIGS. 1A-1B, the base 102 includes a first surface 104 opposite a second surface 106. In an implementation, each of the surfaces 104, 106 are flat and planar. Further, the base 102 includes a plurality of holes 118, with each hole 118 having a size and a shape to receive a securing element, which, in various implementations, is a nail, screw, or bolt for securing the base 102 to formwork, as described below. As such, the holes 118 are preferably circular. The base 102 further includes a first outermost edge 110, a second outermost edge 112, a third outermost edge 114, and a fourth outermost edge 116. Preferably, each of the outermost edges 110, 112, 114, and 116 are rectilinear and perpendicular to one another, such that the base 102 is a square or a rectangle. However, in an implementation, the outermost edges 110, 112, 114, and 116 combine to form various linear or non-linear shapes, such as a circle.

The base 102 further includes a first dimension 120 and a second dimension 121. In the illustrated implementation, the first dimension 120 and the second dimension 121 are equal, such that the first and second surfaces 104, 106 of the base 102 are square. However, in other implementations, the first dimension 120 is greater than, or less than, the second dimension 121. The base 102 also includes a thickness 108, which, in various implementations, is more than 2 inches, or more preferably less than 2 inches, less than an inch, or less than half of an inch. Further, in the illustrated implementation, the elongate member 122 is perpendicular with respect to the base 102. More preferably, the elongate member 122 is perpendicular with respect to the base 102, and centered with respect to the base 102. In other words, a central longitudinal axis of the elongate member 122 is preferably perpendicular to the second surface 106 of the base 102, and preferably intersects a location on the second surface 106 of the base 102 that is equidistant from each outermost edge 110, 112, 114, 116.

Figure 2:
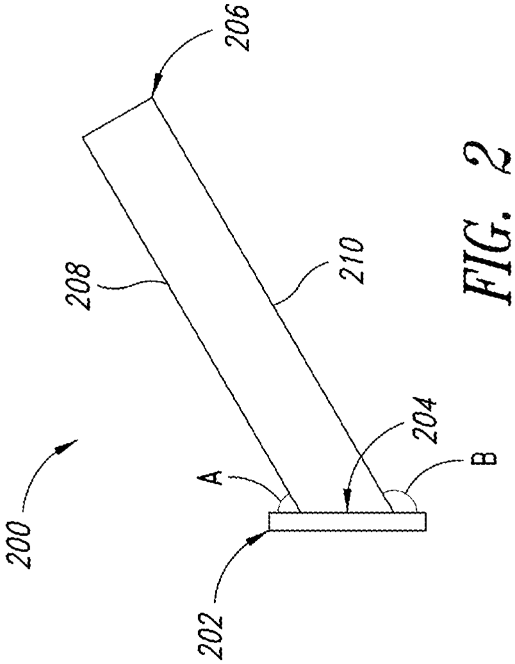
FIG. 2 is a side view of an alternative exemplary implementation of an insert for forming a void in concrete formed in accordance with the present disclosure and having a base plate and an elongate member extending from the base plate at an angle to the base plate.
Figure 3:
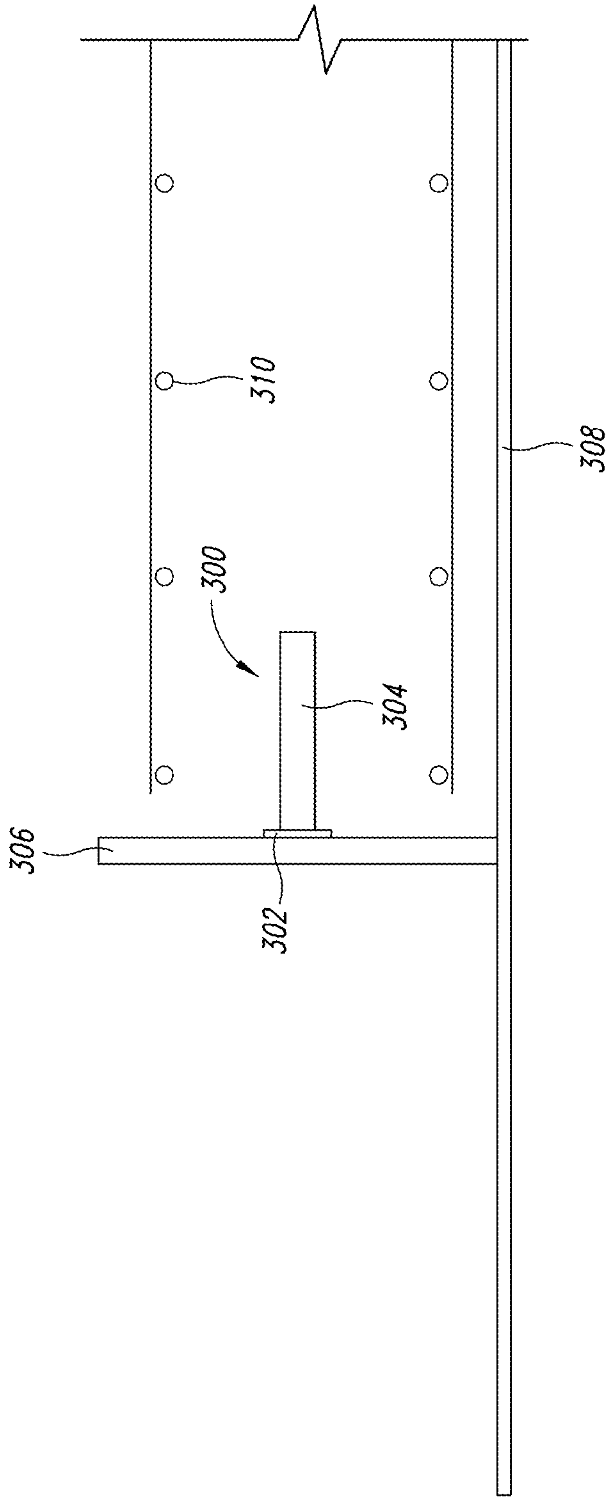
FIGS. 3-6 are side views of various process steps in an exemplary implementation of a method of forming a void in concrete in accordance with the present disclosure.

FIG. 2 illustrates an alternative implementation of an insert 200 having a base 202 integrally formed with an elongate member 206 as a single, unitary component. One of skill in the art will readily appreciate that the insert 200, including base 202 and elongate member 206, can have some, or all, of the features of the insert 100, including base

102 and elongate member 122, and, as such, certain features are not repeated with respect to insert 200 simply in the interest of brevity and to avoid obscuring the differences between the implementations.

In the illustrated implementation, the elongate member 206 of the insert 200 is at an angle with respect to the base 202. More specifically, a first sidewall 208 proximate a surface 204 of the base 202 is at an angle A with respect to the surface 204 of the base 202. A second sidewall 210 proximate the surface 204 is at an angle B with respect to the surface 204. In various implementations, angle A is preferably less than angle B. For example, in an implementation, the angle A is less than 90 degrees, less than 60 degrees, or less than 45 degrees. Accordingly, the angle B is greater than 90 degrees, greater than 120 degrees, or greater than 135 degrees. However, in other implementations, the opposite may also be true, namely that angle A is preferably greater than angle B.

FIGS. 3-6 are side views of process steps in an exemplary implementation of a method for forming a void in concrete. The method begins in FIG. 3 by coupling an insert 300, which may be substantially similar to inserts 100, 200, to a first piece of formwork 306. Preferably, a base plate 302 of the insert 300 is coupled to the first piece of formwork 306 with nails that pass through holes (not shown, but similar to holes 118) in the base plate 302, although other securing mechanisms may be used, for example, bolts, screws, or adhesive. An elongate member 304 extends from the base plate 302 and the first piece of formwork 306.

Then, the first piece of formwork 306, which includes the insert 300, is coupled to a second piece of formwork 308. One of skill in the art will understand that the insert 300 may also be coupled to the first piece of formwork 306 after the first piece of formwork 306 is coupled to the second piece of formwork 308. Further, a plurality of first reinforcing bars 310 are placed proximate the pieces of formwork 306, 308.

Figure 4:
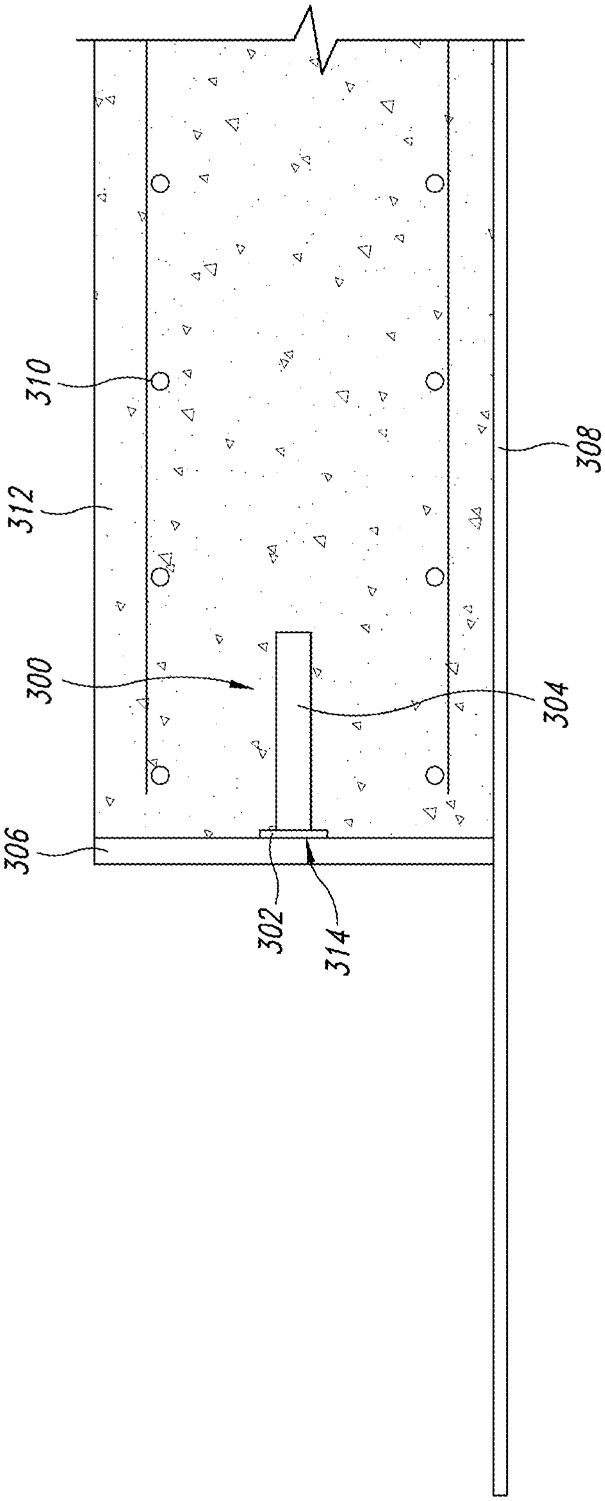
Figure 5:
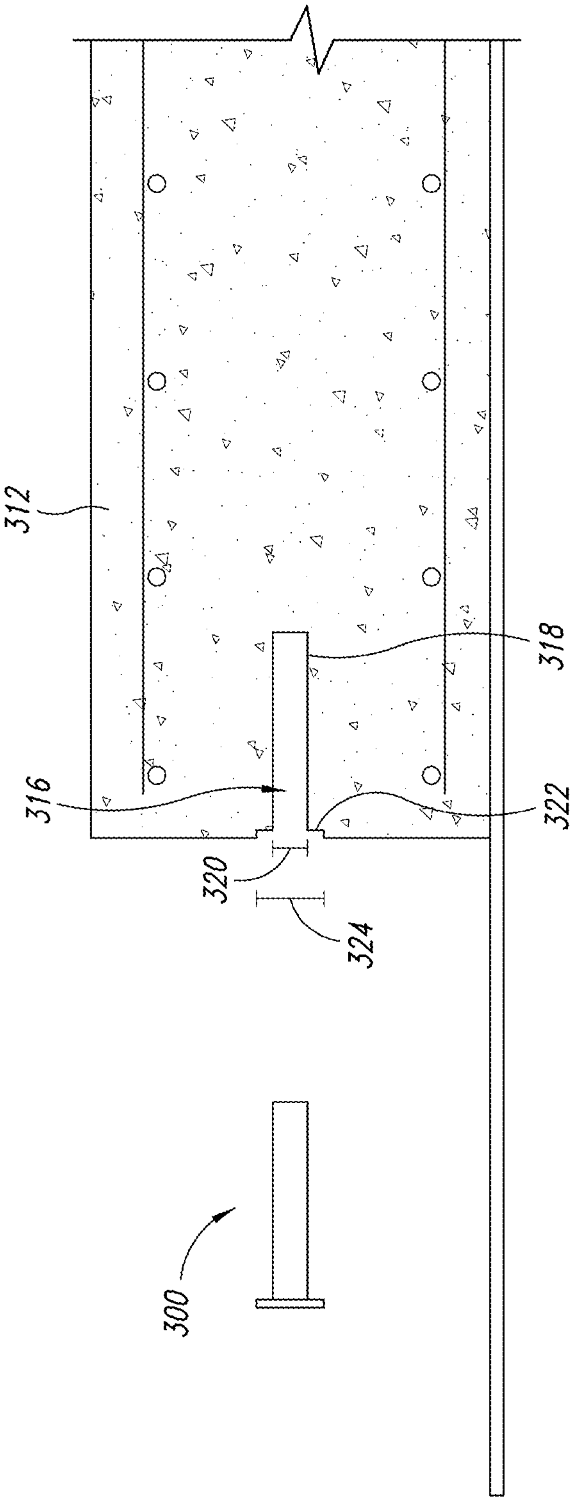

In FIG. 4, concrete 312 is poured between the pieces of formwork 306, 308, such that the concrete 312 surrounds the plurality of first reinforcing bars 310 and the insert 300. More specifically, the concrete 312 surrounds the elongate member 304 and a portion of the base plate 302 that includes every surface of the base plate 302 except for surface 314 that is adjacent the first piece of formwork 306 by virtue of the coupling between the surface 314 of the base plate 302 and the first piece of formwork 300. The concrete is allowed time to partially cure before removing the insert 300. Once the concrete is sufficiently cured that it can hold its own shape without the formwork 306, 308, the first piece of formwork 306 is removed, along with the insert 300, as in FIG. 5. Removal of the insert 300 creates a void 316 having a first portion 318 and a second portion 322. The first portion 318 has a size and a shape corresponding to the elongate member 304. The second portion 322 has a size and a shape corresponding to the base plate 302. Further, the first portion 318 has a first dimension 320 that is preferably less than a second dimension 324 of the second portion 322.

As described above, the elongate member 302 preferably has a cylindrical shape, or a constant circular cross section along its length. Accordingly, the first portion 318 of the void 316 left by the insert 300 has a similar, cylindrical shape. Because the base plate 302 is preferably a square, the second portion 322 of the void 316 preferably has a similar shape. As such, the void 316 has a size and a shape corresponding to a size and a shape of the insert 300. Further, one of skill in the art will appreciate that the insert 300 can be removed from the first piece of formwork 306 and be re-used with a third piece of formwork (not shown) to create additional voids. In other implementations, the insert 300 is designed of a cheaper, less robust material, such that the insert 300 is designed to be disposed after the first use. Although the illustrated implementations include only one insert 300 per piece of formwork 306, one of skill in the art will further understand that several inserts 300 may be used in conjunction with a single piece of formwork.

Figure 6:
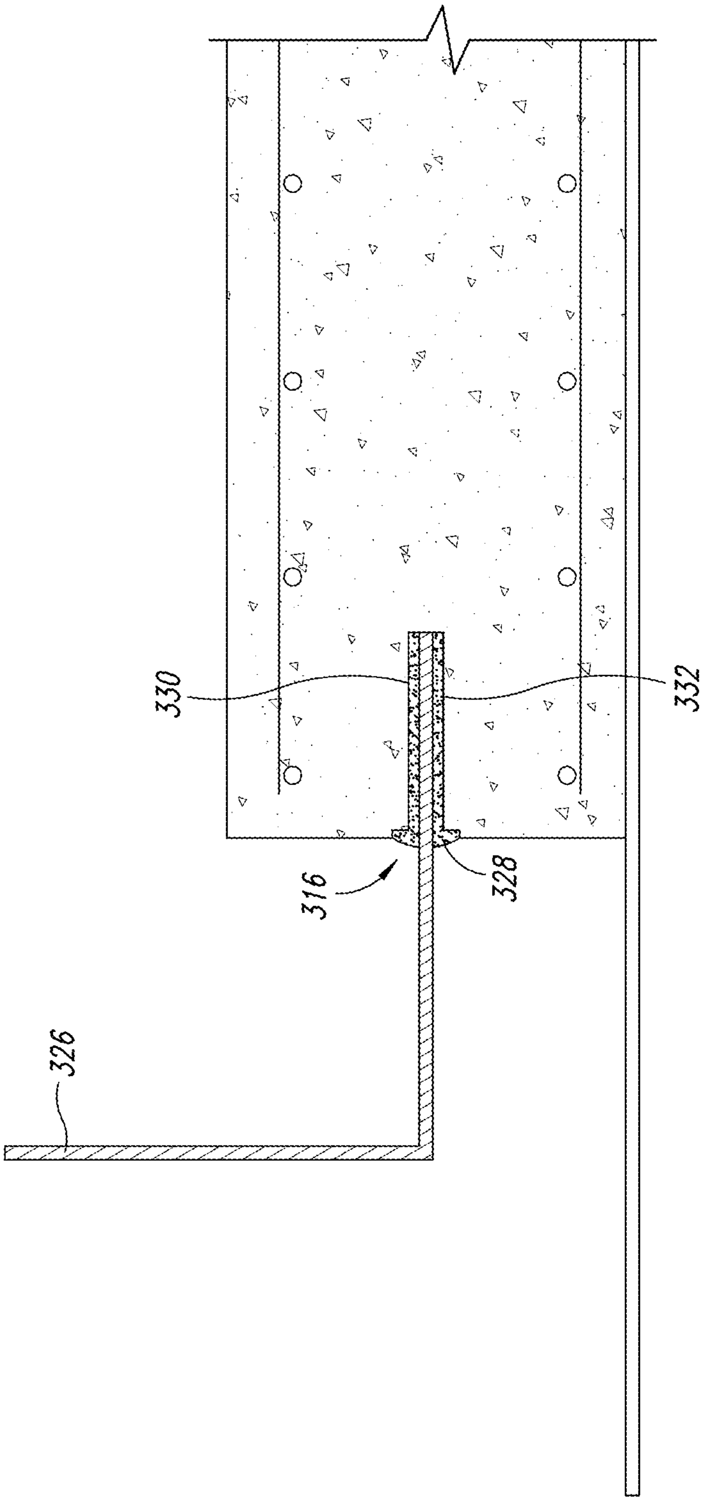

Once the void 316 is formed in the concrete 312 and the insert 300 removed, a reinforcing bar 326 is inserted into the void, as illustrated in FIG. 6. The void 316, and accordingly the insert 300, preferably have a size and a shape such that there is a space or gap between the reinforcing bar 326 and sidewalls 330, 332 of the void 316. After the reinforcing bar 326 is inserted into the void 316, epoxy 328 or other adhesive is used to secure the reinforcing bar 326 to the sidewalls 330, 332 of the void 316. Then, additional formwork (not shown) can be placed around the reinforcing bar 326, and a second pour of concrete completed using the process for the first pour as described herein, wherein the reinforcing bar 326 joins the first and second pours together. Moreover, one of skill in the art will appreciate that the process for forming void 316 can be repeated for as many subsequent pours and reinforcing bars 326 as is necessary for completion of a concrete structure.

Thus, implementations of the present disclosure avoid the pitfalls of known methods and devices for joining concrete pours because no concrete drilling is required for installation, there are no issues with installing bent or angled reinforcing bars, the inserts 100, 200, 300 described herein can be made from low-cost materials, and installation of the inserts 100, 200, 300 and performance of the methods described herein can be achieved with comparatively less labor hours than known methods. Further, one of skill in the art will understand that because the size, shape, orientation and dimensions of the inserts 100, 200, 300 can be customized to correspond to a size, shape, orientation, and dimension of reinforcing bars to be inserted into voids left by the inserts 100, 200, 300, that implementations of the present disclosure also provide a more adaptable and flexible solution to forming voids in concrete. Accordingly, implementations of the present disclosure achieve a cost-effective, efficient, and safe mechanism for forming voids in concrete to receive reinforcing bars such that multiple pours or phases of concrete structures can be more easily, efficiently, and effectively joined together.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A device for forming a void in concrete, comprising:

a single base having a square shape with opposing flat and planar surfaces and a plurality of holes through the opposing flat and planar surfaces, each of the holes having a size and a shape to receive a fastener for coupling the base to a piece of formwork, the base having a width; and a single elongate member extending perpendicular from the base and centered with respect to the base as a single, unitary, integral component with the base, the elongate member having a shape and a size to create the void when the concrete cures around the elongate member and the elongate member is removed from the cured concrete, the void having a size and a shape to receive a reinforcing bar, the elongate member having a length greater than the width of the base and wherein the elongate member is a solid body having a constant circular cross section along an entire length of the elongate member.

2. The device of claim 1 wherein the elongate member includes a coating on an outer surface, the coating preventing adhesion between the outer surface and the concrete.

3. The device of claim 1 wherein the base and the elongate member comprise plastic.

4. The device of claim 1 wherein the base and the elongate member comprise metal.

5. The device of claim 1 wherein the elongate member is absent threads along the entire length of the elongate member.

6. The device of claim 1 wherein the solid body of the elongate member includes only a single solid body.

7. The device of claim 1 wherein the elongate member has a constant outermost diameter along the entire length of the elongate member from the base to a distal end of the elongate member.

8. The device of claim 7 wherein the elongate member is a solid piece of material along the length of the elongate member with the distal end being closed.

9. A device for forming a void in concrete, comprising:

a single base having a square shape with opposing flat and planar surfaces and a plurality of holes through the opposing flat and planar surfaces, each of the holes having a size and a shape to receive a fastener for coupling the base to a piece of formwork, the base having a width; and a single elongate member including only a single solid body and being a single rod extending perpendicular from the base and centered with respect to the base as a single, unitary, integral component with the base, the elongate member having a shape and a size to create the void when the concrete cures around the elongate member and the elongate member is removed from the cured concrete, the void having a size and a shape to receive a reinforcing bar, the elongate member having a length greater than the width of the base and a constant and continuous circular cross section along an entire length of the elongate member.

10. The device of claim 9, wherein the elongate member has a constant outermost diameter along the entire length of the elongate member from the base to an outermost distal end of the elongate member.

11. The device of claim 10, wherein the outermost distal end is closed.

* * * * *